United States Patent [19]
Grosmaire

[11] Patent Number: 5,652,775
[45] Date of Patent: Jul. 29, 1997

[54] METHOD AND DEVICE FOR DETECTING AND MONITORING PERFORATION OF THE VESSEL BOTTOM HEAD OF A NUCLEAR REACTOR

[75] Inventor: Jacques Grosmaire, Collegien, France

[73] Assignee: Framatome, Courbevoie, France

[21] Appl. No.: 630,649

[22] Filed: Apr. 10, 1996

[30]  Foreign Application Priority Data

Apr. 11, 1995 [FR] France .................................. 95 04342

[51] Int. Cl.⁶ .................................................. G21C 17/00
[52] U.S. Cl. .......................... 376/250; 376/247; 376/280
[58] Field of Search ................................ 376/247, 250, 376/280

[56]  References Cited

U.S. PATENT DOCUMENTS

| | | | |
|---|---|---|---|
| 4,449,403 | 5/1984 | McQueen | 376/247 |
| 5,465,280 | 11/1995 | Wedellsborg | 376/280 |

FOREIGN PATENT DOCUMENTS

| | | |
|---|---|---|
| 875803 | 8/1979 | Belgium . |
| 893431 | 10/1982 | Belgium . |
| 897330 | 1/1984 | Belgium . |
| 0 213 872 A2 | 3/1987 | European Pat. Off. . |

*Primary Examiner*—Daniel D. Wasil
*Attorney, Agent, or Firm*—Pollock, Vande Sande & Priddy

[57]  ABSTRACT

The reactor vessel is placed inside a reactor pit having a vertical axis and including a bottom (5) arranged below and aligned with the vessel bottom head. In the event of melt-down of the reactor core as a result of accidental operation of the nuclear reactor, which may lead to perforation of the vessel bottom head, the temperature at a plurality of points (14) distributed over the surface (8) of the reactor pit bottom (5) in line with the vessel bottom head is measured continuously. Optical measurement of the temperatures on the bottom (5) of the reactor pit is preferably carried out by using a plurality of optical fibers (10) arranged on the reactor pit bottom (5), along the length of which Bragg gratings (14), each capable of reflecting a light signal having a particular wavelength, are distributed.

12 Claims, 5 Drawing Sheets

METHOD AND DEVICE FOR DETECTING AND MONITORING PERFORATION OF THE VESSEL BOTTOM HEAD OF A NUCLEAR REACTOR

FIELD OF THE INVENTION

The invention relates to a method and a device for detecting and monitoring perforation of the vessel bottom head of a nuclear reactor, in the event of meltdown of the reactor core and of internals arranged inside the vessel, due to accidental operation of the nuclear reactor.

BACKGROUND OF THE INVENTION

Pressurized water nuclear reactors include a vessel of generally a cylindrical shape, containing the core of the nuclear reactor and arranged with its axis vertical in a cylindrical reactor pit having a bottom end located in line with the vessel. The core of the nuclear reactor is cooled by pressurized water flowing, in contact with the fuel assemblies, in the primary circuit of the reactor and inside the vessel.

In the event of certain accidents occurring in the reactor and leading to loss of operation of the core cooling, consideration must be given, in view of the very grave potential consequences, even though the probability of such an event is extremely small and practically zero, to the case in which the safety injectors of the reactor might not enter into operation. An accident sequence may then occur which leads to meltdown of the core and of the internals of the reactor in the absence of cooling water, which can cause destruction of the vessel bottom head by perforation, and flow of the core mass and of the materials surrounding the core into the concrete pit containing the reactor vessel.

Contact of the molten fuel mass and of the materials surrounding the fuel, called corium, the temperature of which may reach values of the order of 2500° C. in the absence of cooling, may cause complete destruction of the reactor pit bottom.

During normal operation of the reactor, without an accident, the ambient conditions in the reactor pit are very severe. In fact, permanent irradiation takes place, which increases over time during the lifetime of the reactor. A cumulative dose rate over the predicted 40 year lifetime of a reactor may reach 280 Mrad.

It is important, in the scenario of such a coolant loss accident, to monitor the development of the phenomenon and, in particular, the development of the condition of the vessel bottom head, in order to determine whether the latter is partially or completely melted, and whether the corium is flowing through the vessel at only a few points or over the entire surface of the bottom head.

The ambient conditions in the reactor pit, in the event of perforation of the vessel, make it difficult to place cameras in the pit in order to display the development of the phenomenon on a screen. In fact, the vapors of the molten materials, added to the cooling steam, will cause blinding of the monitoring device.

To date no efficient method for detecting perforation of the vessel bottom head of a nuclear reactor and for monitoring the development of the condition of the vessel bottom head in the event of core meltdown has been known.

SUMMARY OF THE INVENTION

The object of the invention is to provide a method for detecting and monitoring perforation of the bottom head of the vessel of a nuclear reactor, in the event of meltdown of the core of the reactor and of internals arranged inside the vessel, due to accidental operation of the nuclear reactor, the vessel being placed inside a reactor pit having a vertical axis, made in a concrete structure of a reactor building and including a pit bottom arranged below and aligned with the bottom head of the vessel. This method makes it possible to detect and monitor the development of the perforation of the nuclear reactor bottom head as a result of an accident which has caused meltdown of the core and of the internal structures of the vessel.

For this purpose, the temperature at a plurality of points distributed over the surface of the reactor pit bottom is measured continuously.

Preferably, in order to implement the invention, temperature measurements are carried out by optical means.

To this end, a light signal with wide frequency spectrum is sent through a plurality of optical fibers arranged on the reactor pit bottom, distributed over the entire cross-section of the reactor pit bottom and each including a plurality of Bragg gratings distributed over their length, each Bragg grating being intended to back-scatter a particular wavelength. The signals back-scattered by the Bragg gratings are recovered and the temperature distribution in the vessel bottom head is determined from the wavelengths of the backscattered signals.

BRIEF DESCRIPTION OF THE DRAWINGS

In order to explain the invention better, a description will now be given, by way of example, with reference to the attached figures, of the implementation of the method according to the invention and of the means for carrying out this implementation by an optical method.

DESCRIPTION OF THE PREFERRED EMBODIMENT

Figure 1:
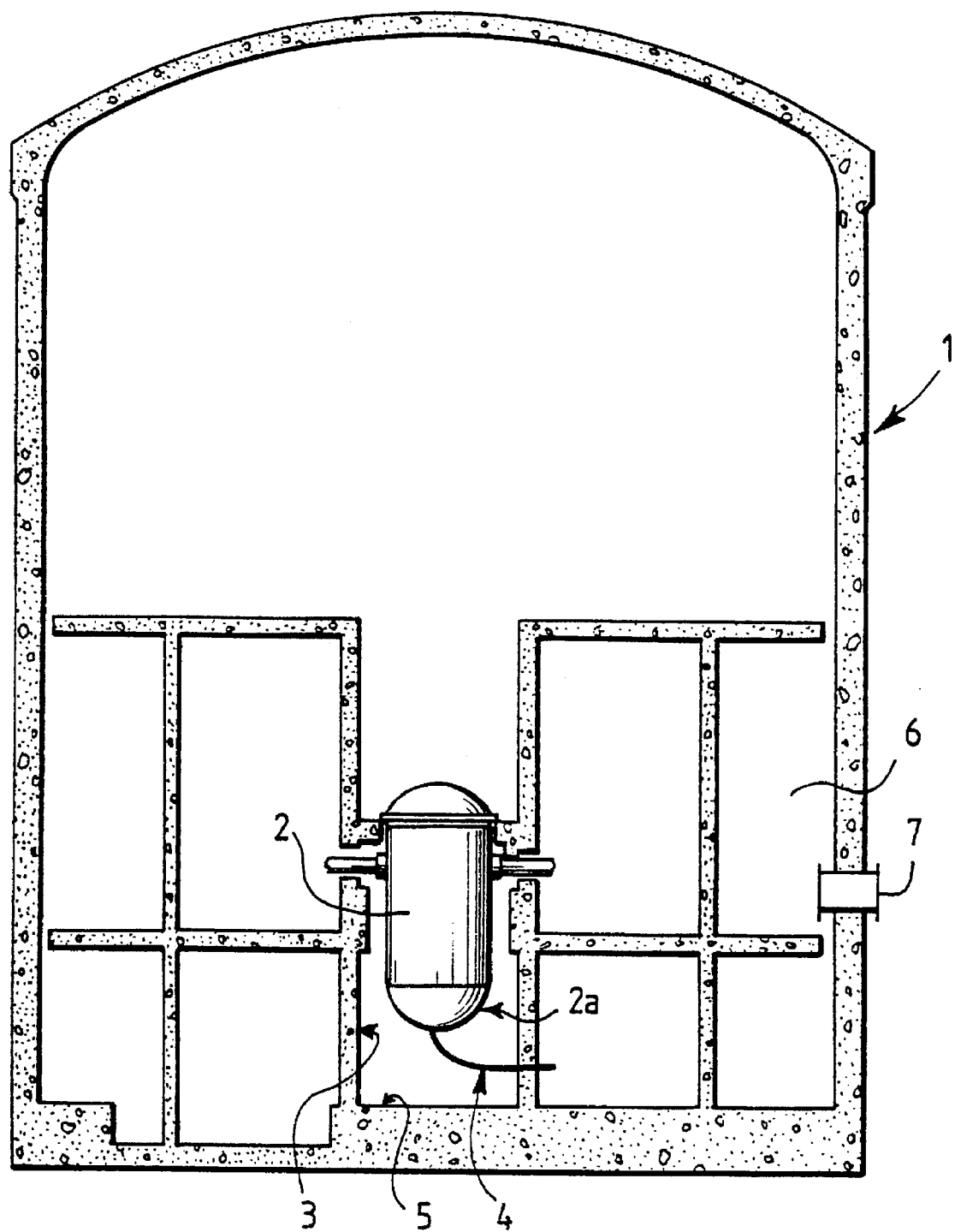
FIG. 1 is a schematic view in vertical section of the building of a reactor cooled by pressurized water.

FIG. 1 shows the building of a pressurized water nuclear reactor 1. The reactor building 1 consists of a large concrete structure comprising a pit 3 of vertical axis, within which pit the vessel 2 of the nuclear reactor, containing the reactor core consisting of fuel assemblies, is arranged. The pit 3, which constitutes the reactor pit, has a flat bottom end 5 which is located below and aligned with the domed bottom head 2a of the vessel 2.

A plurality of instrumentation guide tubes, such as the tube 4 shown by way of example, pass through the domed vessel head 2a. Each of the instrumentation tubes makes it possible to connect a vessel bottom head penetration sleeve to a measurement room located laterally with respect to the reactor pit 3 in the reactor building. In the case of a nuclear reactor with an electrical power of 1000 MW, fifty sleeves, each connected to one instrumentation tube, pass through the nuclear reactor vessel bottom head 2a. The core instrumentation assembly makes it possible to measure the neutron flux and the temperature inside the core during operation of the reactor.

An annular compartment 6, in an arrangement substantially coaxial with the reactor pit, is provided inside the reactor building 1, which has a generally circular cross-section. The annular compartment 6 can be used for installing fluid circuits or electrical circuits including control or connection boxes which are placed inside the annular compartment. The leaktight penetrations, such as the penetration 7 in the exterior wall of the safety building, are distributed at the periphery of the reactor building and allow passage of electrical cables and connection tubes for various fluid circuits of the reactor, with the exception of outlet of the steam produced by the reactor and inlet of the feedwater of the steam generators associated with the vessel 2. The leaktight penetration passages such as the penetration 7 can be used for passing any measurement conduits, which may consist of electrical measurement cables or optical fibers.

The vessel 2 contains the reactor core, consisting of fuel assemblies producing heat because of the nuclear reactions which take place within the reactor core, this heat being withdrawn from the core by the primary cooling water which itself heats and vaporizes feedwater in the steam generators (not shown) of the nuclear reactor which are arranged inside the reactor building. The reactor building 1 also contains safety cooling circuits for the nuclear reactor, which are set in operation in the event of defective operation or degradation of the primary circuit.

In all cases, the core is therefore cooled sufficiently to avoid excessive heating of the fuel material, which could lead to degradation of the fuel assemblies.

It is therefore highly improbable, if not impossible, for the core to undergo excessive heating, leading to such degradation and, a fortiori, to complete meltdown occurring together with melting of the structures inside the vessel surrounding the core.

Nonetheless, this type of highly improbable accident must be taken into consideration, so that it is necessary to provide means for detecting and monitoring perforation of the vessel bottom head by a molten mass flow constituted by the fuel material core, the fuel element cladding material and certain structures inside the nuclear reactor vessel and arranged around the core.

After perforating the vessel at one or more points, the molten materials originating from the reactor vessel fall onto the bottom 5 of the reactor pit 3. When the molten material comes into contact with the concrete constituting the bottom 5 of the reactor pit 3, the temperature of the reactor pit bottom which is, under normal conditions, close to 100° C., may increase to a temperature as high as 1500° C.

According to the invention, perforation of the vessel bottom head is detected and the development of the phenomenon is monitored by measuring and recording the temperature at a plurality of points on the reactor pit bottom 5 which are arranged in line with the bottom head 2a of the vessel 2. Thermal mapping of the bottom 5 of the reactor pit 3 is thus carried out, which makes it possible to display the zones on the reactor pit bottom onto which the corium flows, and therefore the zones on the vessel bottom head in which perforation has occurred, for example at a penetration sleeve of an instrumentation guide tube.

In order to obtain an accurate map of the temperature gradients over the entire surface of the reactor pit bottom, it is necessary to provide a relatively large number of measurement points, for example of the order of 100, corresponding to approximately one measurement point per area of 0.3 to 0.5 m².

It is, of course, possible to carry out thermal mapping of the reactor pit bottom by placing temperature sensors, such as thermocouples or resistive probes, at various points on the surface of the bottom 5 of the reactor pit 3, in line with the vessel bottom head 2a. However, use of sensors requires electrical connection of each of the sensors by at least two electrical wires, to a supply and measurement unit which is preferably located outside the reactor building. Use of isolated sensors therefore requires a very large amount of cabling, which may be very expensive. On the other hand, the numerous cabling lines are at risk of being destroyed rapidly in the event of perforation of the vessel bottom head. Furthermore, the electrical measurements may be interfered with by numerous factors inside the reactor building.

Use will therefore preferably be made of an optical measurement method, making it possible to avoid the use of a large amount of cabling and interference with the measurements in the ambient conditions of a nuclear reactor.

EP-A-0,213,872 discloses an optical measurement method based on optical reflectometry, making it possible to detect the values of a parameter such as temperature at various locations along a fiber. A light signal is sent through the fiber, a part of which signal is back-scattered towards a measurement system because of local refractive index variations due to local temperature variations in the fiber. However, when this method is used, the total attenuation in the fiber is large, which makes it necessary to emit a high-amplitude signal. Furthermore, in order to make it possible to differentiate between the signal propagation times in the fiber in order to locate the points subjected to variable temperatures, it is necessary to analyze the reflected signal at a high frequency, which increases the cost of the equipment used.

A method for back-scattering optical systems inside an optical fiber is also known. This method uses a grating which can be etched on the fiber at any location and which is known as a Bragg grating.

Figure 2:
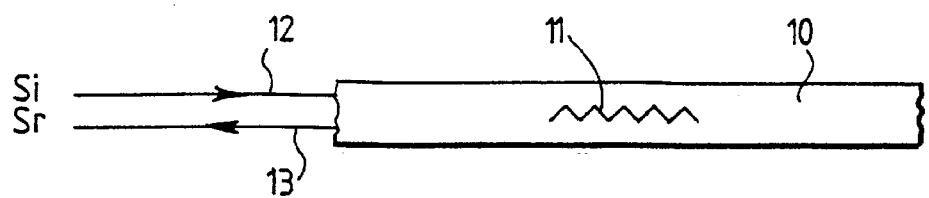
FIG. 2 is a schematic view showing a part of an optical fibers including a Bragg grating.
Figure 3A:
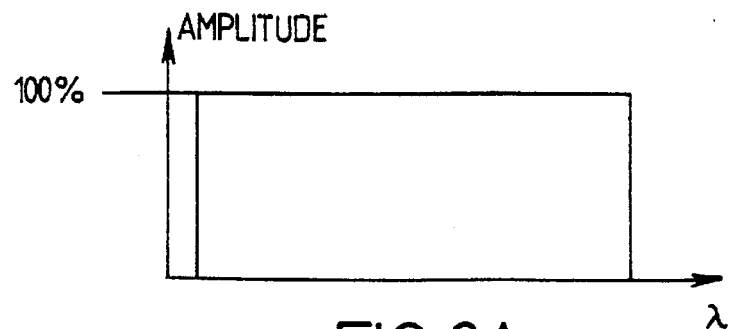
FIGS. 3A and 3B are diagrams showing the shape of an optical signal sent through an optical fibers and the shape of the signal back-scattered by a Bragg grating etched on the fibers.

FIG. 2 shows a segment of an optical fiber 10 on which a Bragg grating 11, represented symbolically in FIG. 2, has been produced by photogravure. If a light beam 12 having a wide frequency spectrum is sent through the fiber on which the Bragg grating 11 has been etched, the frequency spectrum of the incident beam 12 being represented very schematically in FIG. 3A, the signal 13 of wavelength $\lambda 0$, reflected by the Bragg grating 11 and returned to the input end of the fiber 10, has a precise wavelength $\lambda 0$ depending on the embodiment of the Bragg grating 11. The light signal 13 reflected by the Bragg grating 11 is represented in FIG. 3B.

In fact, the wavelength $\lambda 0$ of the signal reflected by the grating 11 is perfectly defined for defined mechanical strain conditions and fiber temperature in the zone in which the grating 11 has been produced.

If one of these conditions is modified and, in particular, if the temperature in the zone of the fiber 10 including the grating 11 is modified, the reflected signal has a new wavelength λ'0 which is different from λ0, the difference between λ'0 and λ0 increasing as the perturbation of the fiber zone in which the grating is located increases. In particular, in the case of a temperature rise, the frequency shift of the reflected symbol makes it possible to determine the temperature rise.

Figure 3B:
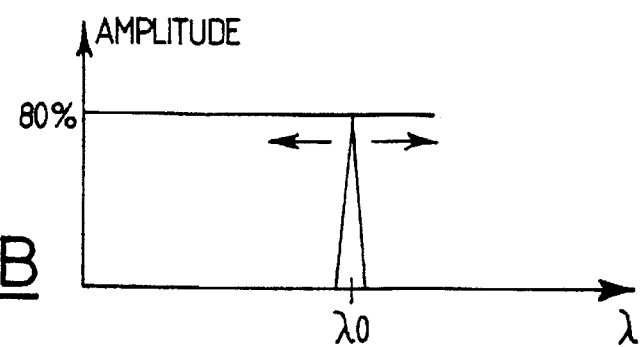

As shown in FIG. 3B, the reflected signal is slightly attenuated, its amplitude being, for example, 80% of the amplitude of the incident beam.

In the case of using an optical fiber, along the length of which successive zones including Bragg gratings with different characteristics are distributed, each grating reflecting a signal having a well-determined wavelength, the reflected signal has a plurality of wavelengths, each corresponding to a wavelength reflected by a particular Bragg grating arranged along the length of the fiber.

It is thus possible to produce optical fibers including successive Bragg gratings, spaced along the length of the fiber and reflecting signals having different wavelengths, $\lambda 1$, $\lambda 2, \ldots, \lambda i, \ldots, \lambda n$. Such optical fibers, which have been represented in FIGS. 4 and 5, can be used advantageously for implementing a detection and monitoring method according to the invention.

Figure 4:
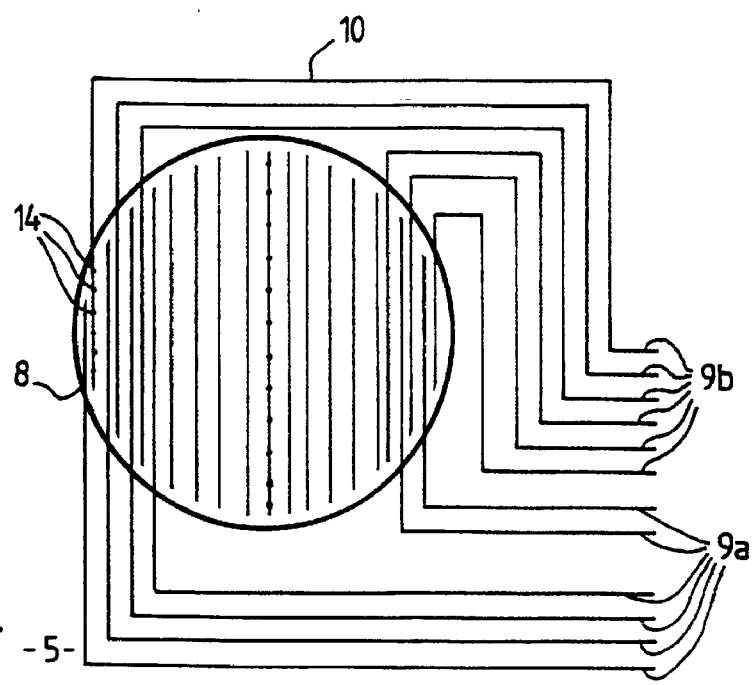
FIG. 4 is a schematic top view showing the arrangement of temperature-measurement optical fibers in the nuclear reactor pit bottom.

FIG. 4 represents the vertical projection 8 of the vessel bottom head 2a onto the nuclear reactor pit bottom 5.

In order to implement a method according to the invention for detecting and monitoring perforation of the vessel bottom head, two sets of optical fibers 9a and 9b are arranged on the pit bottom 5, and constitute a network covering the zone 8 corresponding to the projection of the vessel bottom head and making it possible to carry out temperature measurements of the reactor pit bottom 5 at a very large number of points distributed within the zone 8.

The optical fibers 10 constituting the sets 9a and 9b include a straight part, along which measurement zones 14 are arranged successively and regularly spaced, which consist of successive zones of the optical fiber in which Bragg gratings are etched.

The successive Bragg gratings etched on a given optical fiber 9 are produced so as to reflect signals having different wavelengths $\lambda 1, \lambda 2, \ldots, \lambda i, \ldots, \lambda n$.

The straight parts of the optical fibers 10 of the set 9a and of the set 9b are all mutually parallel and arranged with a fixed separation of the order of 0.30 m. The straight parts of the fibers 10 constituting the set 9a point in the opposite direction to the fibers 10 constituting the set 9b and are each interposed between two successive fibers of the set 9b, so that the fibers of the sets 9a and 9b have a comb arrangement with a pitch of approximately 0.30 m.

In the case of a reactor pit bottom 5 having a diameter of the order of 6 m, approximately twenty successive fibers, each including a set of measurement points consisting of Bragg gratings, are provided. Approximately one hundred measurement points are thus obtained, distributed over the entire area of the reactor pit bottom 5, in the zone 8 located in line with the vessel bottom head of the nuclear reactor.

Each of the measurement points will be defined by two coordinates. One of these corresponds to an order number of the optical fiber, which can be determined easily because the fibers are connected, as will be explained hereafter, to an optical switch and are supplied successively. The other coordinate corresponds to the reflected wavelength, i.e., that is to say to the Bragg grating, the position of which on the optical fiber is perfectly determined.

It is therefore possible to associate, with each temperature measurement, the precise position of the point where this measurement was made.

It is thus possible to determine the thermal mapping of the reactor pit bottom, in line with the vessel bottom head, by analyzing the signals reflected by the optical fibers of the sets 9a and 9b.

The measurement optical fibers can be placed directly on the reactor pit bottom or arranged inside metal jackets which mechanically protect them. The entire network of optical fibers may also be held and protected by a lightweight layer of concrete, for example refractory concrete, spread above the network of temperature-measurement fibers deposited on the bottom of the reactor pit. In this case, the fibers are embedded inside a thin layer of concrete onto which the corium flows if the vessel is perforated.

Figure 5:
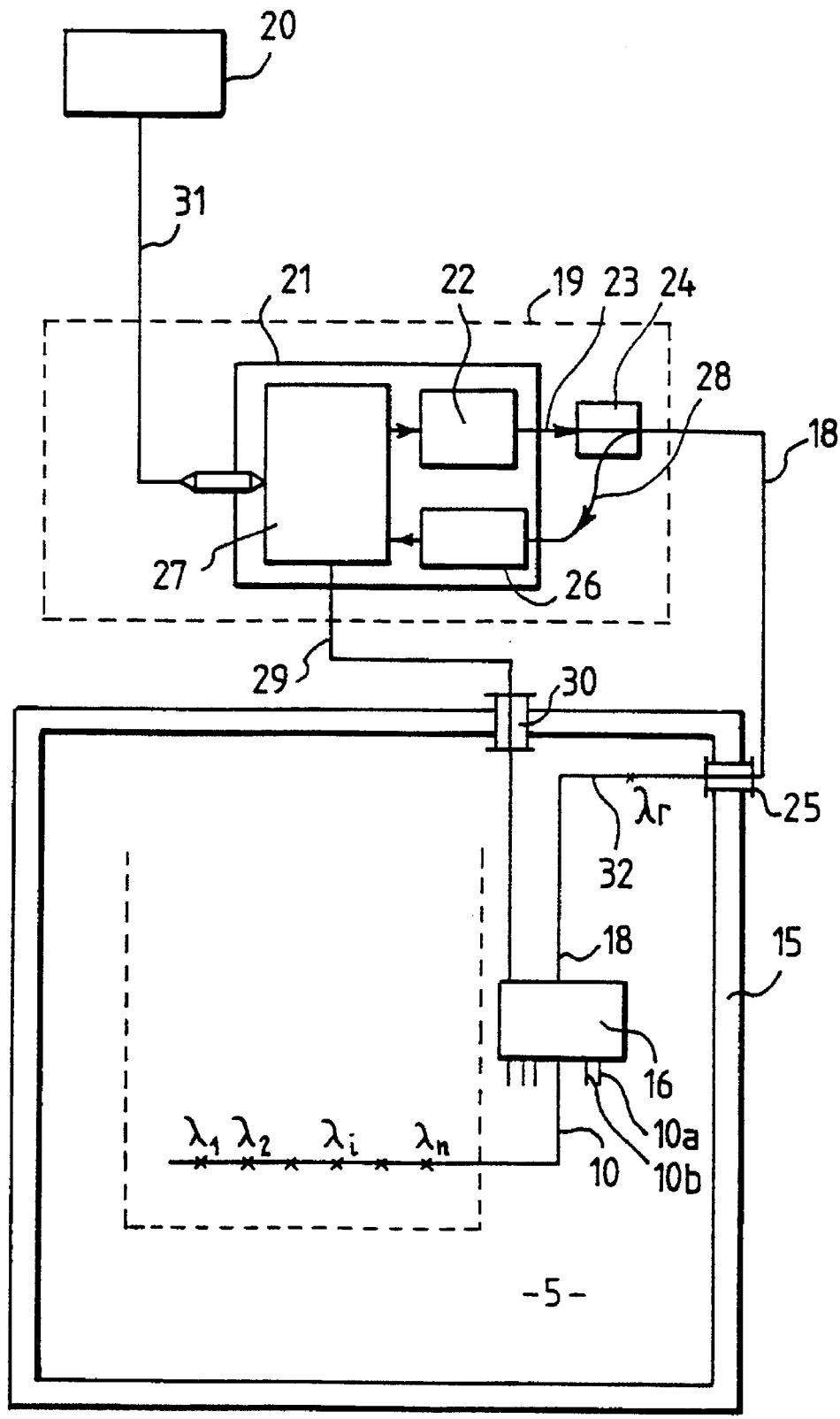
FIG. 5 is a diagram of a detection and monitoring installation making it possible to implement the method according to the invention by optical temperature measurement in a nuclear reactor pit bottom.

FIG. 5 shows a temperature-measurement installation which can be used for implementing the method according to the invention for detecting and monitoring perforation of the vessel bottom head of a nuclear reactor.

FIG. 5 schematically represents the section 15 of the nuclear reactor building within which a part of the temperature-measurement installation is placed. The part of the installation arranged inside the reactor building 15 includes the optical fibers 10a, 10b, ..., 10p constituting the two sets of fibers 9a and 9b placed in a comb arrangement in the zone of the reactor pit bottom 5 located in line with the vessel bottom head. Each of the fibers 10 of the sets 9a and 9b includes, in its part arranged in line with the vessel, n measurement zones consisting of Bragg gratings which each reflect a signal of wavelength $\lambda 1, \lambda 2, \ldots, \lambda i, \ldots, \lambda n$.

The part of the device located inside the nuclear reactor containment 15 also includes an optical switch 16 which may, for example, be a switch of the "lightwave switch" type marketed by Hewlett Packard.

Each of the fibers 10 of the sets of fibers 9a and 9b is connected at one of its ends to an output of the optical switch 16.

The switch 16 includes an input connected to an optical fiber 18 which transmits to the optical switch a light beam having a wide spectral band. The switch 16 distributes the light beam with wide spectral band successively into each of the measurement optical fibers 10.

The part of the measurement installation arranged outside the reactor building 15 includes a central acquisition unit 19 which is generally arranged inside an electrical equipment room in proximity to the reactor building, and which is connected, to a control and display station 20 located in the control room of the nuclear plant, as well as to the optical switch 16 arranged inside the reactor building 15. The central acquisition unit 19 includes a subassembly 21 for emission, reception and processing of the measurement signals. The subassembly 21 includes an emission module 22 which emits the light beam with wide frequency band which is transmitted to the optical switch 16, inside the reactor building 15, via a first optical fiber 23, a coupler 24 and the supply optical fiber 18 connected to the output of the coupler 24. The emission module 22 includes a wide-spectrum light-emitting diode, or else a tunable diode, which emits a succession of signals, each corresponding to a different wavelength within a wide spectrum.

The optical fiber 18 passes through the wall of the reactor building via a leaktight penetration 25.

The emission and reception subassembly 21 furthermore includes a reception module 26 which receives the light signals reflected by the gratings traced on the optical fibers, and a supply, control and processing unit 27.

The input of the reception module 26 is connected by an optical fiber 28 to an output channel of the coupler 24, so that the optical signals reflected in the various fibers by the gratings reach the reception module 26, which transmits to the unit 27 electrical signals representative of the light signals reflected inside the fibers.

The optical signals converted by the reception module 26 into electrical signals are transmitted to the processing and control unit 21. The unit 21 transmits to the control and display station 20 data which are recorded or displayed in the form of an image of the thermal mapping of the reactor pit bottom.

The processing and control unit 21 supplies and controls the emission module 22, processes the measurement signals originating from the reception module 26 and operates the optical switch 16, via an electrical connection line 29 which provides a link, through a leaktight penetration 30, between the processing and control unit 21 and the optical switch 16 arranged inside the reactor building 15.

The control and processing unit 21 is furthermore connected to the display station 20 located in the control room via a connection line 31.

In addition, the information can also be transmitted to a monitoring station which is external to the control room, or even to the nuclear plant, in order to make it possible to monitor the development of the perforation of the vessel bottom head in the event of a serious accident.

The optical switch 16 sequentially supplies each of the optical fibers 10 so that reflected signals are received successively by the reception module 26. Each signal received by the reception module is associated with the label of the supplied fiber from which the reflected signal has come. The various frequencies received determine the temperature-measurement points corresponding to each of the gratings distributed along the length of the fiber.

As a variant, the optical switch 16 may be installed outside the reactor building 15.

In this case, the leaktight penetration 25 is intended for passage of the optical fibers 10, which include an end part arranged on the reactor pit bottom 5, in line with the vessel bottom head. Bragg gratings, each of which reflects a signal of determined wavelength, are etched on this end part of the optical fibers arranged mutually parallel below the vessel bottom head. If the optical switch 16 is placed outside the reactor building 15, the electrical control line 29 is connected to the optical switch 16 outside the reactor building without having to pass through the wall of the reactor building via a leaktight penetration such as the penetration 30.

A Bragg grating 32 is etched on a part of the optical fiber 18 for supplying the optical switch and located inside the reactor building 15, in a zone in which the temperature is relatively stable and can be measured easily by known means. The value of the signal corresponding to this known temperature is used as a reference value and makes it possible to calibrate the system with respect to wavelength.

Figure 6:
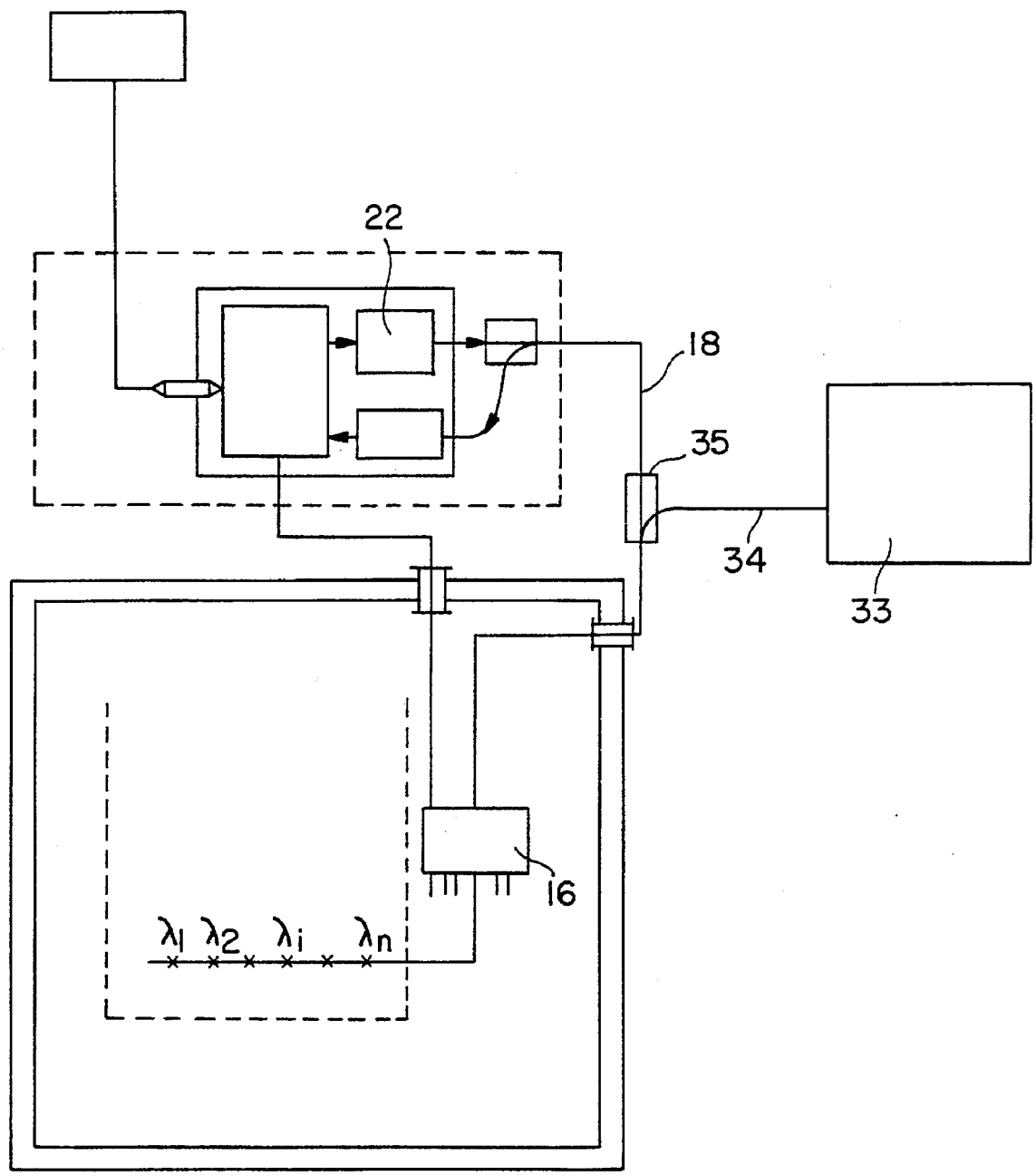
FIG. 6 is a schematic view of a detection and monitoring installation according to an alternative embodiment.

FIG. 6 schematically represents an alternative embodiment of the installation for measuring temperature on a nuclear reactor pit bottom.

The corresponding elements in FIGS. 5 and 6 have the same reference numerals.

The measurement installations shown in FIGS. 5 and 6 are identical as regards the elements which make it possible to determine the thermal mapping of the vessel bottom head and differ solely by the presence, in the case of the installation shown in FIG. 6, of a means making it possible to test and monitor continuously of the properties of the measurement circuits used and to check the integrity of the fibers and of the optical components of the measurement circuit.

The test and monitoring means consists of a laser reflectometer 33 of known type, which may consist, for example, of an OTDR reflectometer (Optical Time Domain Reflectometer) marketed by Laser Precision Corporation. The reflectometer 33 emits a laser beam centered on a wavelength located outside the spectrum of the beam emitted by the emission module 22. This beam is transmitted by the optical fiber 34 to the supply fiber 18, by means of a coupler 35. The beam of the reflectometer 33 is transmitted by the optical switch 16 to each of the measurement optical fibers 10. The beam is returned, via the free end of each of the fibers 10, to the switch 16 and, via the fiber 18 and the coupler 35, to the reflectometer 33.

The reflectometer 33 makes it possible to monitor the behavior of the return beam with respect to the emitted beam, and thereby to monitor the behavior over time of the various components of the optical circuit. The part of the fibers 10 on which the Bragg gratings are etched is particularly exposed to a high irradiation dose rate, because the fibers 10 are placed inside the reactor pit. Opacification of the fibers under irradiation is observed over time. This phenomenon causes attenuation of the signals inside the optical fibers. The reflectometer makes it possible to monitor the phenomenon over time and to give indications which make it possible to replace the measurement optical fibers in profitable time during normal shutdown periods of the reactor.

Figure 7:
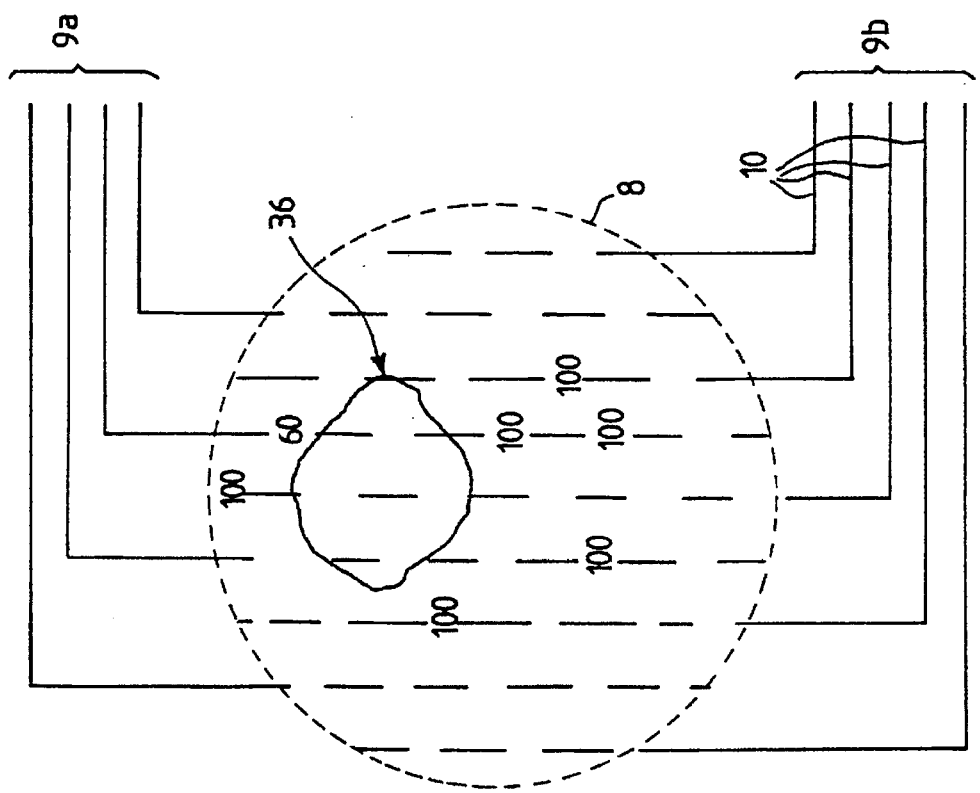
FIG. 7 is a plan view of a nuclear reactor pit bottom on which the temperatures measured by a device according to the invention have been plotted, in the case of local perforation of the reactor vessel bottom head.

FIG. 7 represents an example of the thermal mapping of the reactor pit bottom, when perforation of the reactor vessel bottom head is starting, with flow of corium which comes into contact with a zone of the reactor pit bottom. The two sets of optical fibers 9a and 9b which are placed in opposite directions in a comb arrangement, as already described, have also been shown.

The numerical values indicated at each of the measurement points correspond to the temperatures measured by the Bragg gratings etched on the optical fibers 10. These values are indicated in degrees Celsius, make it possible to plot the envelope of a zone 36 of the reactor pit bottom which corresponds to a zone of spreading of the corium flowing through a local opening in the vessel bottom head. This opening may correspond, for example, to a vessel bottom head penetration sleeve which has become unwelded and detached.

As a function of the speed of flow of the corium, the value of the temperature on the reactor pit bottom increases at each point where the corium comes into contact with the reactor pit bottom.

Figure 8:
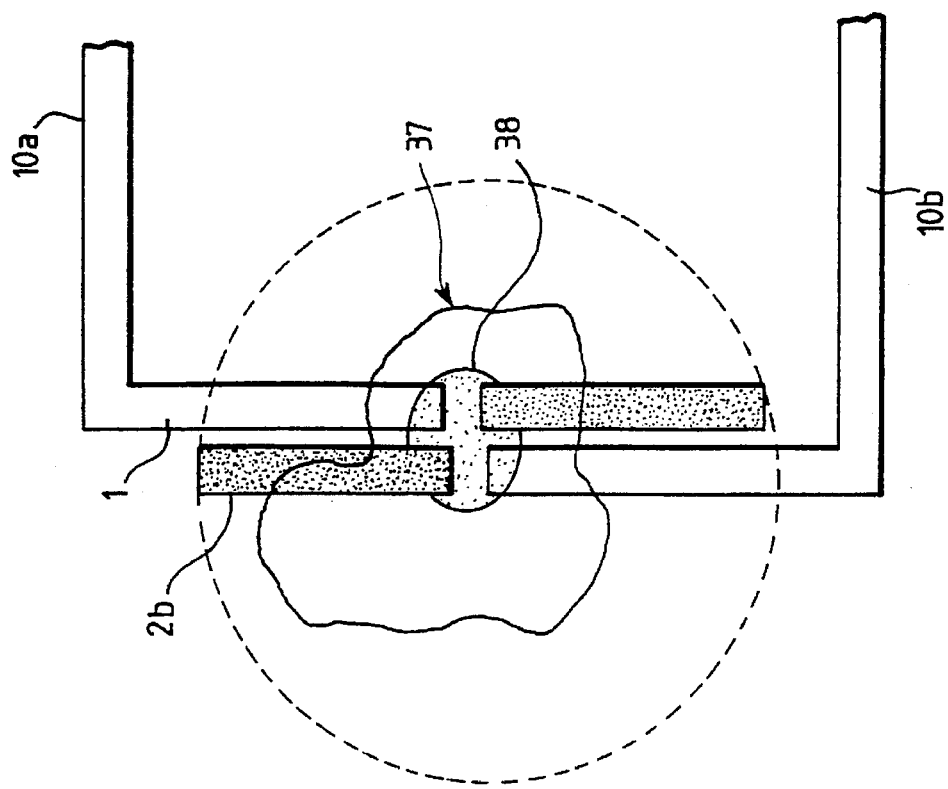
FIG. 8 is an enlarged view of a part of the reactor pit bottom into which the molten material of the core and of the internals of the vessel have poured out after perforation of the vessel bottom head.

FIG. 8 shows a part of the reactor pit bottom onto which the molten corium has poured out and has spread over a zone 37 having an irregular contour and covering a part of the length of a first optical fiber 10a of the first set 9a of measurement optical fibers and part of a second optical fiber 10b of the second set of measurement optical fibers 9b. In the central part 38 of the corium spreading zone 37, which corresponds to the zone where the corium has fallen onto the reactor pit bottom, the temperature of the reactor pit bottom on which or within which the optical fibers are placed tends to increase strongly, and exceed, for example, a temperature of 1000° C. This temperature is such that the concrete reactor pit bottom can become degraded, so that the fibers come into direct contact with the corium. The optical fibers are destroyed and cut in the zone 38 where the corium has fallen.

The corium which spreads from the central part 38, inside the zone 37, cools, and the destruction of the fibers is limited to the two fibers passing through the central zone 38.

Although the optical fibers 10a and 10b are cut at the zone 38, these fibers retain an active part upstream of the central zone 38 in which they are cut.

In FIG. 8, the parts of the fibers 10a and 10b which become unusable have been shaded and the part of the fibers 10a and 10b which is still usable for measurements has been left blank. The inverted arrangement of the fibers 10a and 10b of the sets of fibers 9a and 9b makes it possible to continue to carry out temperature measurements over the entire corium spreading zone, because of the adjacent arrangement of the measurement parts of the fibers 10a and 10b.

It is therefore possible to monitor the development of the propagation of molten corium over the reactor pit bottom in all cases. Recording the temperature values measured makes it possible to reconstruct the development of the phenomenon and analyze its consequences.

The method and the device according to the invention therefore make it possible, in all cases, to carry out detection and efficient monitoring of the perforation of the vessel of a nuclear reactor by molten corium. It is possible, in particular, to monitor the development of the degradation of the vessel bottom head of the nuclear reactor manifested by one or more flows of corium onto the reactor pit bottom.

Other arrangements of optical fibers may be used in order to carry out temperature measurement at a plurality of points on the vessel bottom head of a nuclear reactor.

It is also possible to use measurement methods based on optical fibers other than measurement methods involving Bragg gratings etched on the fibers. More generally, it is also possible to carry out temperature measurements at a plurality of points on the reactor pit bottom in order to determine thermal mapping of the reactor pit bottom, by using measurement means other than optical means, e.g., isolated sensors, such as thermocouples, distributed over the vessel bottom head of the reactor, although the use of such isolated sensors does not provide the same advantages as the use of a network of optical fibers.

The invention applies not only to detecting and monitoring perforation of the vessel of a pressurized water nuclear reactor, but also to detecting and monitoring perforation of a vessel of a different type of nuclear reactor, such as a boiling water, or heavy water, nuclear reactor, following accidental meltdown of the core.

I claim:

1. A method for detecting and monitoring perforation of the bottom head of the vessel of a nuclear reactor, in the event of meltdown of the core of the reactor and of internals arranged inside the vessel, due to accidental operation of the nuclear reactor, the vessel being placed inside a reactor pit having a vertical axis, made in a concrete structure of a reactor building and including a reactor pit bottom arranged below and aligned with the bottom head of the vessel, said method comprising the step of continuously measuring the temperature at a plurality of points distributed over a surface of said reactor pit bottom.

2. The method according to claim 1, comprising the steps of
   (a) sending a light signal with wide frequency spectrum through a plurality of optical fibers arranged on said reactor pit bottom, distributed over an entire cross-section of said reactor pit bottom, each of said optical fibers including a plurality of Bragg gratings distributed over a length of said optical fibers, each Bragg grating being intended to back-scatter a signal of particular wavelength;
   (b) recovering the signals back-scattered by said Bragg gratings; and
   (c) determining a distribution of the temperature in said reactor pit bottom from the wavelengths of the back-scattered signals.

3. The method according to claim 2, including the steps of
   (a) successively sending a wide-spectrum light signal through each of the fibers of said plurality of fibers arranged on said reactor pit bottom;
   (b) recovering each of the signals reflected by each of said Bragg gratings distributed along the length of the optical fiber;
   (c) converting the reflected optical signals into electrical signals; and
   (d) processing the electrical signals so as to determine the temperatures at each of said Bragg gratings distributed along the length of said optical fiber.

4. The method according to claim 3, wherein each of successive fibers through which a wide-spectrum signal is sent and from which a reflected signal is recovered is defined by a label, so as to localize each of the points on said reactor pit bottom on which a temperature measurement is carried out, by the label of an optical fiber and by a frequency corresponding to a reflection frequency of a grating of said fiber.

5. The method according to claim 2, wherein a light signal having a frequency outside the frequency spectrum of the wide-spectrum light signal is sent through the optical fibers, and a reflected signal is recovered in order to monitor the condition of the optical fibers and of the entire optical measurement circuit.

6. A device for detecting and monitoring perforation of a bottom head of a vessel of a nuclear reactor, in the event of meltdown of a core of said nuclear reactor and of internals arranged inside said vessel, due to accidental operation of said nuclear reactor, said vessel being placed inside a reactor pit having a vertical axis, made in a concrete structure of a reactor building and including a pit bottom arranged below and aligned with a bottom head of said vessel, said device including a plurality of optical fibers, arranged on said reactor pit bottom, distributed over an entirety of a zone located in line with a bottom head of said vessel, each of said optical fibers including, in a part located in a zone aligned with said bottom head, Bragg gratings distributed over their length and each capable of reflecting a signal having a wavelength determined and different from wavelengths of other Bragg gratings arranged on a same optical fiber.

7. The device according to claim 6, further including an optical switch including an input channel to which an optical fiber for supplying a light signal with wide frequency band is connected, and a plurality of output channels, to each of which one end of a measurement optical fiber is connected.

8. The device according to claim 7, wherein the measurement optical fibers constitute first and second sets of optical fibers having a straight part arranged on said reactor pit bottom in line with said bottom head, in arrangements which are all mutually parallel and oriented in opposite directions, the straight parts of said optical fibers of said first set being interposed between the straight parts of said optical fibers of said second set.

9. The device according to claim 7, further including a module for emitting a wide-spectrum light signal, connected via a supply optical fiber and said optical switch to said measurement optical fibers, a reception module connected to the supply fiber via a coupler, and a control and processing unit electrically connected to said emission module and to said reception module.

10. The device according to claim 9, wherein said control and processing unit is connected to a control and display station to enable display of the temperature distribution on said reactor pit bottom.

11. The device according to claim 9, wherein said emission module, said reception module and said control and processing unit are arranged outside said reactor building and said optical switch is arranged inside said reactor building.

12. The device according to claim 9, wherein said emission module, said reception module, said control and processing unit and said optical switch are arranged outside said reactor building.

* * * * *